United States Patent [19]

Baker et al.

[11] Patent Number: 5,618,875

[45] Date of Patent: *Apr. 8, 1997

[54] HIGH PERFORMANCE CARBON FILAMENT STRUCTURES

[75] Inventors: R. Terry K. Baker; Nelly M. Rodriguez, both of State College, Pa.

[73] Assignee: Catalytic Materials Limited, Mansfield, Mass.

[*] Notice: The term of this patent shall not extend beyond the expiration date of Pat. No. 5,413,866.

[21] Appl. No.: 435,335

[22] Filed: May 5, 1995

Related U.S. Application Data

[63] Continuation-in-part of Ser. No. 947,416, Sep. 18, 1992, Pat. No. 5,413,866, which is a continuation-in-part of Ser. No. 602,182, Oct. 23, 1990, Pat. No. 5,149,584.

[51] Int. Cl.$^6$ .................................. C08K 3/04; D01F 9/12
[52] U.S. Cl. ..................... 524/495; 524/496; 423/447.1; 423/447.2; 423/447.3; 423/447.5
[58] Field of Search ..................... 524/495, 496; 423/447.1, 447.2, 447.3, 447.5

[56] References Cited

U.S. PATENT DOCUMENTS

| | | | |
|---|---|---|---|
| 4,491,536 | 1/1985 | Tomoda et al. | 524/495 |
| 4,606,848 | 8/1986 | Bond | 524/495 |
| 4,663,230 | 5/1987 | Tennent | 428/367 |
| 4,999,244 | 3/1991 | Morimoto | 524/496 |
| 5,068,061 | 11/1991 | Knobel et al. | 524/495 |
| 5,149,584 | 9/1992 | Baker et al. | 428/297 |
| 5,165,909 | 11/1992 | Tennent et al. | 423/447.3 |
| 5,210,116 | 5/1993 | Hashimoto et al. | 524/495 |

FOREIGN PATENT DOCUMENTS

| | | | |
|---|---|---|---|
| 0037946 | 4/1974 | Japan | 524/496 |
| 0012842 | 11/1990 | WIPO | 524/495 |

*Primary Examiner*—Peter A. Szekely

[57] ABSTRACT

Disclosed are novel high performance composite structures comprised of carbon filaments in a matrix selected from the group consisting of polymeric materials, carbon, ceramic materials, and metals. The carbon filaments have a relatively high surface area, electrical resistivity, and crystallinity. The present invention also relates to a method of preparing said carbon filaments by use of an unsupported catalyst.

10 Claims, No Drawings

HIGH PERFORMANCE CARBON FILAMENT STRUCTURES

CROSS REFERENCE TO RELATED APPLICATIONS

This is a continuation-in-part of U.S. Ser. No. 07/947,416 filed Sep. 18, 1992, now U.S. Pat. No. 5,413,866 which is a continuation-in-part of U.S. Ser. No. 07/602,182, filed Oct. 23, 1990, now U.S. Pat. No. 5,149,584.

FIELD OF THE INVENTION

The present invention relates to novel high performance composite structures comprised of carbon filaments in a matrix material such as polymeric materials, carbons, ceramics, and metals. The carbon filaments have a relatively high surface area, are electrically conductive, and are substantially crystalline. The present invention also relates to a method of preparing said carbon filaments by use of unsupported catalysts.

BACKGROUND OF THE INVENTION

The superior mechanical and strength-to-weight properties of carbon fibers and carbon filaments has led to an important class of high performance carbon reinforced composites. These high performance composites have many uses, some of which are for the production of aircraft and automobile body parts for which both strength and lightweight are critical. Such composites enable manufacturers to produce relatively light weight structures without sacrificing strength. Consequently, much research has been directed to producing carbon reinforced composite materials with ever increasing high performance properties and physical features that make them more valuable in commercial products and processes.

While high performance carbon fibers have met with a degree of commercial success as reinforcing materials in fiber/matrix composites, they nevertheless suffer from, inter alia, delamination problems. Several attempts have been made to modify carbon fibers to improve their interlaminar properties. For example, U.S. Pat. No. 4,816,289 teaches a method of producing crimped fibers. While crimped fibers have improved interlaminar properties, they would nevertheless still suffer from an unacceptable degree of delamination.

Another process teaches the formation of graphite fibers onto which secondary silicon carbide whiskers can be grown. While such a structure would show a substantial improvement in interlaminar shear strength, they unfortunately suffer from a number of shortcomings. For example, in the production of silicon carbide whiskers, relatively high temperatures (i.e., >1000° C.) are required. Still further, silicon carbide is intrinsically abrasive and thus leads to handling and processing problems. Other shortcomings include: (a) the thermal expansion coefficient of silicon carbide differs from that of carbon, and as a consequence, can initiate or propagate cracks in the resulting composite; (b) the densities of silicon carbide whiskers(ca. 3.22 g/cc) are considerably higher than those of carbon (2.25 g/cc); (c) at present, it is not possible to control silicon carbide whisker orientation and growth characteristics; and (d) the costs associated with producing secondary silicon carbide whiskers on carbon fibers is considerable. It is also believed that the bonding between the silicon carbide whiskers and the parent carbon fibers is non-chemical and thus would not be as strong as desired in certain applications.

Another process variation is taught in Sekiyu Gakkaishi, 28(5), 409–412, Egashira et. al, 1985, wherein carbon whiskers are grown on carbon fibers from the vapor phase catalyzed by iron sulfide. For example, the parent fibers are preoxidized with $HNO_3$ at a temperature of about 120° C. for one hour to facilitate supporting Fe on them. They are then impregnated with a 0.5 mol/L $Fe(NO_3)_3$ solution, followed by reduction with hydrogen. A mixture of benzene, $H_2S$, and $H_2$ are employed as the reactant gas. The whiskers, or filaments, produced are straight, non-branched filaments. That is, they cannot be characterized as being branched, spiral, or helical, as are the filaments of the present invention.

U.S. Pat. No. 5,149,584, to Baker et al. teaches carbon fiber/carbon filament structures in a matrix material, such as polymers, carbon, and ceramics. Also, co-pending application U.S. Ser. No. 07/947,416, filed Sep. 18, 1992, now U.S. Pat. No. 5,413,866, claims carbon filaments, some of which are used in the present invention.

While such methods of modifying carbon fibers do improve the interlaminar shear strength of the parent fibers to various degrees, there still exists a need in the art for high performance composite structures reinforced with carbon filaments alone, particularly those that are conductive. There is a growing demand for composite materials which have electrical conductive properties or which can act as insulators. Consequently, there is a need in the art for high performance composite materials containing superior reinforcing components and which can also conduct electricity.

SUMMARY OF THE INVENTION

In accordance with the present invention, there is provided a composite structure comprised of carbon filaments contained in a matrix material, wherein the matrix material is selected from the group consisting of polymeric materials, carbons, ceramics, and metals; and wherein the carbon filaments are characterized as having; (i) a surface area from about 0.2 to 3,000 $m^2/g$; (ii) an electrical resistivity from about 0.17 μohm·m to 0.8 μohm·m; (iii) a crystallinity from about 5% to about 100%; and (iv) a length up to about 100 microns.

In a preferred embodiment of the present invention, the carbon filaments have an average crystallinity greater than about 50%.

In another preferred embodiment of the present invention, the filaments are predominantly straight.

There is also provided a method of preparing carbon filaments, which method comprises: reacting a suitable carbon containing gas in the presence of a metal catalyst comprised of a metal particle at a temperature from the decomposition temperature of the carbon containing gas to the deactivation temperature of the catalyst, for an effective amount of time, which metal catalyst is comprised of at least one Group VIII metal and optionally a second metal selected from Group IB of the Periodic Table of the Elements.

In a preferred embodiment of the present invention, the catalyst is a bimetallic of which one of metals is a metal from Group IB of the Periodic Table of the Elements, and a second metal selected from the group consisting of Fe, Ni, Co, and Zn, wherein the Group IB metal is present in the alloy in an amount ranging from about 5 to 95 atomic percent (at. %).

In other preferred embodiments of the present invention, the Group IB metal is Cu and a third metal is present and is selected from the group consisting of Ti, W, Sn and Ta, which metal is substituted for up to about 10 at. % of the second metal.

In still other preferred embodiments of the present invention, the catalyst is comprised of a Fe;, Cu/Ni, Cu/Fe, or Cu/Co bimetallic.

DETAILED DESCRIPTION OF THE INVENTION

It will be understood that the terms "carbon filaments" and "carbon nanofibers" can be used interchangeably herein.

The filaments of the present invention are novel high performance materials having a unique set of properties. Such properties include: (i) a surface area from about 0.2 to 3,000 $m^2/g$, preferably from about 50 to 800 $m^2/g$, more preferably from about 100 to 700 $m^2/g$, and most preferably from about 250 to 350 $m^2/g$, which surface area is determined by $N_2$ adsorption at $-196°$ C.; (ii)) an electrical resistivity from about 0.17 µohm·m to 0.8 µohm·m, preferably from about 0.2 µohm·m to 0.5 µohm·m, more preferably from about 0.3 µohm·m to 0.5 µohm·m; (iii) a crystallinity from about 5% to about 100%, preferably from about 50% to 100%, more preferably from about 75% to 100%, and most preferably from about 90% to 100%; (iv) a length up to about 100 microns, preferably from about 1 micron up to about 100 microns, more preferably 1 micron to about 50 microns; and (v) a distance from about 0.335 nm to about 1.1 nm, preferably from about 0.335 nm to about 0.67 nm, and more preferably from about 0.335 nm to about 0.40 nm between the graphite platelets. The shape of the filaments will be any suitable shape depending on the catalyst used to grow the filaments. Non-limiting examples of preferred shapes are straight, branched, twisted, spiral, helical, coiled, and ribbon-like. Further, the surface area of the carbon filaments can be increased by careful activation with a suitable etching agent, such as carbon dioxide, steam, or the use of a catalyst, such as an alkali or alkaline-earth metal.

The matrix of the carbon filament-reinforced composites of the present invention can be any suitable material depending on the intended end use of the composite. The matrix is preferably comprised of a material selected from the group consisting of polymers, ceramics, carbons, metals, and mixtures thereof. The carbon filaments of the present invention can also be used as the conductive component in a matrix material, preferably a thermoplastic resin material. They can also be used as the conductive component in a conductive coating.

The carbon filaments are produced by growing them with the use of a suitable catalyst in the presence of an effective carbon-containing compound. They are preferably grown from unsupported catalytic metal powders; although they can also be grown on a substrate onto which a catalytic metal particle precursor has been deposited. Non-limiting examples of suitable substrate materials from which the carbon filaments may be grown include: carbon materials, particularly carbon fibers; inorganic oxides such as alumina and silica; carbides, such as silicon carbide; nitrides, such as silicon nitride; and metallic substrates, such as a metallic wire, mesh, and screen; cellulosic materials; and polymeric foam. It is preferred that the substrate be in a form selected from the group consisting of a sheet, a fiber, and powder particles. If a metallic substrate is used from which the filaments of the present invention are grown, it is preferred that the metal not be one in which carbon can be readily dissolved. Preferred metallic substrates are those comprised of Ti, Ta, and Al. It is also within the scope of the present invention that a mixture of metal powders be used. That is, where all of the particles are catalysts particles wherein some portion of the particles are non-catalytic, such as ceramic particles. As previously mentioned, it is most preferred in the practice of the present invention that the filaments be grown without the use of a substrate.

Catalysts suitable for growing the carbon filaments of the present invention are Group VIII metals, preferably Fe and Ni-based catalysts. The catalysts are typically alloys or multi-metallics comprised of a first metal selected from the metals of Group IB of the Periodic Table of the Elements, and a second metal selected from the group consisting of Fe, Ni, Co, Zn, or mixtures thereof. Group IB metals include Cu, Ag, and Au. Preferred are Cu and Ag with Cu being the most preferred. The Group IB metals is present in an amount ranging from about 0.5 to 99 at. % (atomic %). A third metal may also be present. Although there is no limitation with respect to what the particular third metal can be, it is preferred that it be selected from the group consisting of Ti, W, Sn, and Ta. When a third metal is present, it is substituted for up to about 20 at. %, preferably up to about 10 at. %, and more preferably up to about 5 at. %, of the second metal. It is preferred that the catalyst be comprised of copper in combination with Fe, Ni, or Co. More preferred is copper in combination with Fe and Ni from an economic point of view. That is, a catalyst of which Fe is used in place of some of the Ni would be less expensive than a catalyst comprised of Cu in combination with only Ni.

The structural forms of the filaments of the present invention can be controlled to a significant degree. For example, use of a catalyst which is comprised of only Fe will produce predominantly straight filaments having their graphite platelets substantially perpendicular to the longitudinal axis of the filaments. The distance between the platelets (the interstices) will be between about 0.335 nm and 1.1 nm, preferably between about 0.335 nm and 0.67 nm, and more preferably from about 0.335 nm to 0.40 nm. It is most preferred that the distance be as close to 0.335 nm as possible, that is, that it be substantially 0.335 nm. The catalyst can also contain up to about 99 at. %, even up to about 70 at. %, or even up to about 50 at. %, preferably up to about 30 at. %, more preferably up to about 10 at. %, and most preferably up to about 5 wt. % copper, with the remainder being a Group VIII metal, preferably nickel or iron, more preferably iron. Catalysts having a high copper content (70 at. % to 99 at. %) will typically generate filaments which are predominantly helical or coiled, and which have a relatively low crystallinity (from about 5 to 5%). Lower concentrations of copper, e.g., 0.5 to 30 at. % have a tendency to produce spiral and branched filaments, whereas a catalyst with about 30 to 70 at. %, preferably 30 to 50 at. % copper will produce predominantly branched filaments.

If a substrate is used to grow the carbon filaments of the present invention, conventional techniques can be used to deposit a catalyst metal precursor on the surface of the substrate. Non-limiting examples of such techniques include incipient wetness, vaporization, and electrolytic deposition if the substrate is conducting. A typical incipient wetness technique includes dissolving a suitable salt of each metal of the catalyst in an appropriate solvent, then wetting the substrate, with the salt solution. The wetted substrate is then dried at a temperature greater than 100° C., preferably from about 105° C. to about 120° C., and more preferably at about 110° C. After drying, they are calcined at a temperature from about 200° to 300° C., thereby converting the individual metals to their respective oxide form. The so-treated substrate is then heated, in a hydrogen containing atmosphere, at a temperature from about 400° to about 600° C., preferably from about 450° to 550° C., for an effective amount of time, to produce the catalyst in an appropriate catalytic form. By effective amount of time, we mean that amount of time needed to reduce substantially all of the metal oxides to the respective multi-metallic state having a suitable particle size. Suitable particle sizes are from about 25 Å to about 1500 Å preferably from about 50 Å to about 1000 Å, and more preferably from about 50 Å to about 200Å. The catalyst particle size determines the diameter of the filament.

Metal salts suitable for use in the present invention are salts which are soluble in water, as well as in organic solvents. Non-limiting examples of water soluble salts suitable for use herein include nitrates, sulfates and chlorides. Non-limiting examples of salts soluble in organic solvents, which are suitable for use herein include formates, acetates, and oxalates. Preferred are the organic soluble salts because the substrate, if carbon fibers, will not have to be pretreated. However, if the substrate is a ceramic oxide, nitride, or boride, water soluble salts are preferred. Non-limiting examples of organic solvents suitable for use herein include: alcohols; such as methanol, ethanol, propanol, and butanol; ketones, such as acetone; acetates and esters; and aromatics, such as benzene and toluene.

When an aqueous solution of metal salt is used, it is preferred that the surface of the substrate, if carbon fibers, be pretreated to make the surface more acceptable to the catalyst. One preferred method of pretreating the carbon fibers is to oxygenate the fiber surface using atomic oxygen, or a compound that will produce atomic oxygen in a plasma. Although an oxidizing agent, such as nitric acid, can also be used, it is not preferred because it would have a tendency to oxygenate only the defect sites of the surface instead of oxygenating substantially the entire surface as would atomic oxygen. The surface of the substrate is preferably treated with atomic oxygen for an effective amount of time, at about room temperature. By effective amount of time, we mean for that amount of time, preferably for that minimum amount of time, needed to oxygenate substantially the entire surface of the carbon fibers.

If a vaporization technique is used to deposit the catalyst precursor, volatile metal salts, such as carbonyls, or the elemental metal, is used. Vaporization can be accomplished by any appropriate technique, such as vapor deposition.

The filaments of the present invention are produced by reacting the catalyst in a heating zone with the vapor of a suitable carbon-containing compound for an effective amount of time. By an effective amount of time, we mean, for that amount of time needed to produce the desired filament structural arrangement. This amount of time will generally be from about 10 minutes to about 8 hours, preferably from about 10 minutes to about 6 hours, more preferably from about 15 minutes to 2 hours, and most preferably from about 15 minutes to about 1 hour. The heating zone is maintained at a temperature from the decomposition temperature of the carbon-containing compound to the deactivation temperature of the catalyst. Generally, this temperature will range from about 500° C. to about 700° C., and preferably from about 550° C. to about 650° C.

Carbon-containing compounds suitable for use in the practice of the present invention are compounds composed mainly of carbon atoms and hydrogen atoms, although carbon monoxide may also be used. The carbon-containing compound, which is typically introduced into the heating zone in gaseous form, will generally have no more than 8 carbon atoms, preferably no more than 6 carbon atoms, more preferably no more than 4 carbon atoms, and most preferably no more than 2 carbon atoms. Non-limiting examples of such compounds include CO, methane, ethane, ethylene, acetylene, propane, propylene, butane, butene, butadiene, pentane, pentene, cyclopentadiene, hexane, cyclohexane, benzene, toluene. Combinations of gases are preferred, particularly carbon monoxide and ethylene.

It may be desirable to have an effective amount of hydrogen present in the heating zone. By an effective amount, we mean that minimum amount of hydrogen which will maintain a clean catalyst surface(free of carbon residue), but not so much that will cause excessive hydrogasification, or burn-off, of carbon from the filaments and/or fiber substrate structure, if present. Generally, the amount of hydrogen present will range from about 5 to 40 vol. %, preferably from about 10 to 30 vol. %, and more preferably from about 15 to 25 vol. %. Hydrogen serves two competing functions. For example, on the one hand it acts as a cleaning agent for the catalyst, and on the other hand it hydrogasifies, or causes carbon burn-off, of the carbon structure. For some catalyst systems, such as Cu:Fe, the hydrogasification reaction is relatively slow, thus, an effective amount of hydrogen is needed to clean the catalyst in order to keep it clean of carbon residue and maintain its activity. For other catalyst systems, such as Cu:Ni, where the activity is so high that excessive hydrogasification occurs, even at relatively low levels of hydrogen, little, if any, hydrogen is needed. In fact, Cu:Ni is so active that it utilizes essentially all of the carbon deposited thereon to grow filaments, and thus, there is generally no carbon residue to clean off.

After the filaments are grown, it may be desirable to treat the final structure with an aqueous solution of an inorganic acid, such as a mineral acid, to remove any excess catalyst particles. Non-limiting examples of mineral acids which can be used include sulfuric acid, nitric acid, and hydrochloric acid. Preferred is hydrochloric acid.

It is preferred that the filaments have a crystallinity greater than about 25%, more preferably greater than about 50%, and most preferably greater than about 75%. Crystallinities greater than about 80% and even 90% are also preferred, particularly crystallinities up to about 100%. Cyrstallinity can be measured by any appropriate technique. Such techniques include resistivity, as set forth in Example 5 hereof, and oxidation measurements, as set forth in Example 6 hereof. Such techniques are well known to those skilled in the art and further elaboration is not needed for the purposes of the present invention.

The matrix component employed in the practice of the present invention can be any suitable matrix material, including electrically conductive matrix materials, which is reinforced with a carbon filament material. Non-limiting examples of suitable matrix materials include polymeric materials, including both organic polymers as well as inorganic polymers. Included in preferred inorganic polymers are the so-called semi-inorganic materials such as silicones, which have thermal stability, high lubricity, extreme water repellence, and physiological inertness and which are used in adhesives, lubricants, protective coatings, paints, electrical insulation, synthetic rubber, and prosthetic replacements for bodily parts. Included in the organic polymeric materials are thermoplastic resins, thermosetting plastics, and elastomers. Other suitable matrix materials include carbon; ceramics; metals; and mixtures all of the above. Preferred are thermoplastic resins and a blend of a thermoplastic resin with an elastomer.

Non-limiting examples of thermoplastic resins suitable as the matrix material of the present invention include: polyamides, such as nylon-6,6 and nylon-6; polyolefins, such as polypropylene and polystyrene; polycarbonates; polyesters, such as polyethyleneterephthalate; acetals, such as polyoxymethylene; polyetherketones, including polyetheretherketone (PEEK); polysulfones, such as polysulfone (PS) and polyethersulfone; polysulfides, such as polyphenylene sulfide; and polyimides, such as polyimide, epoxy bismaleimide, polyetherimide (PEI), polyamideimide (PAI, polybenzimidazoles, and fluorinated polyimides. Preferred are polyetherketones; polysulfones, such as polysulfone and polyethersulfone; polysulfides, such as polyphenylene sulfide; polytetrafluoroethylene (PTFE)and polyimides, such as polyimide, polyetherimide, polyamideimide, polybenzimidazoles, and fluorinated polyimides. Thermosetting plastic materials are also suitable as the matrix material for the composite materials of the present invention.

Non-limiting examples of elastomers suitable for use in the practice of the present invention include: natural rubber, styrene type elastomers, such as styrene-butadiene styrene block co-polymers or styrene-isoprene-styrene block co-polymers, as well as their hydrogenated forms; PVC-type elastomers; polybutadiene type elastomers, such as 1,2 polybutadiene resins or trans-1,4-polybutadiene; polyethylene-type elastomers, such as methylcarboxylate-polyethylene co-polymers, ethylene vinylacetate co-polymers, and ethylene-ethylacrylate co-polymers; isoprene rubber, EPDM, butyl rubber, nitrile rubber, chloroprene rubber, silicone rubbers, halogenated elastomers, polysulfide rubber, polyurethanes, and acrylic rubber. Preferred are the butadiene rubbers. Also suitable as matrix materials are pitch derived from petroleum, coal, or any other suitable organic precursor. If a blend of thermoplastic resin and an elastomeric material is used, it is preferred that less than about 200 wt. parts of the elastomeric material be used per 100 wt. parts of thermoplastic resin.

If an elastomeric material is used it can be cured in the crosslinking processes commonly used in the rubber industry, by adding sulfur for vulcanization, vulcanization accelerator, vulcanization aid and thermosetting resin such as phenol resin for thermosetting resins, hardening catalyst such a Lewis acid, peroxide for crosslinking peroxide compounds, and co-crosslinking agent (multi-functional methacrylate, divinyl benzene, dimaleimide, etc.)

Some examples of the aforementioned vulcanization accelerators include ammonium aldehydes, aminoaldehydes, guanidines, thioreas, thiazols, dithiocarbamates, xathogenes, thiurams, etc. Examples of vulcanization aids include steric acid, oleic acid, lauric acid, zinc white, litharge, magnesium oxide, zinc-stearate, etc.

The effects intended in the present invention can be obtained by compounding 1–99 parts, preferably about 1–90 parts, more preferably 2–80 parts, even more preferably 2–30 parts, and most preferably 3–20 parts by weight of the carbon filaments used in the present invention with 100 wt. parts of the matrix material. The reinforcing effects are not sufficient when the amount of carbon filaments is below 1 wt. parts, while the amount should not exceed 50 wt. parts for those composites where superior processing characteristic of the matrix, especially thermoplastics, is desired.

The composites of the present invention are prepared by using known mixing and processing devices, such as a kneader, Bambary mixer, plastomill, rolls, etc. Further, desired shapes can be formed by using any known method, such as extrusion molding, press molding, etc.

Other reinforcing materials may also be present in the composite materials of the present invention. Non-limiting examples of such other reinforcing materials include carbon black, silica, inorganic and organic reinforcing fibers such as glass fiber, aramid fiber, or bits of carbon fibers. The composites of the present invention may also contain antioxidants, stabilizers, processing aids, and flame retardants.

The invention will be illustrated in more detail with reference to the following examples, which should not be construed to be limiting in scope of the present invention.

EXAMPLE 1

A series of runs were made using 100 mg samples of a copper:nickel bimetallic powder (Cu:Ni ratio 3:7). Each sample was placed in a two inch diameter fused silica reactor tube at room temperature (about 22° C.), then heated to a temperature of 350° C. in a 10% hydrogen/helium mixture at a flow rate of 100 standard cubic centimeters per minute (sccm) in a clam shell type electric furnace. These conditions were maintained for 30 minutes at which time the hydrogen flow was stopped and the sample brought to the desired reaction temperature in the presence of helium alone. Upon reaching the desired reaction temperature, the flow of helium was replaced by a flow of ethylene (100 sccm) and the reaction was allowed to proceed for 90 minutes. Following this procedure, the flow of ethylene was replaced by helium and the sample was cooled to room temperature and reweighed to determine the amount of carbon produced. The weight changes of the samples are shown in Table I below.

TABLE I

| Effect of Temperature on Carbon Filament Formation From Interaction of Cu:Ni (3:7) with Ethylene | | |
| --- | --- | --- |
| Sample | Temperature °C. | % Conv. of Ethylene to Carbon |
| a | 300 | 0 |
| b | 400 | 0 |
| c | 450 | 0 |
| d | 500 | 19 |
| e | 550 | 57 |
| f | 600 | 66 |
| g | 650 | 68 |
| h | 700 | 69 |
| i | 720 | 0 |
| j | 750 | 0 |

Subsequent examination of the carbon deposits in a scanning electron microscope showed that the carbon consisted entirely of filamentous, or nanofiber form.

EXAMPLE 2

The experimental procedure of Example 1 was followed except that the composition of the copper:nickel bimetallic powders was varied from 80:20 to 0:100 with the reaction temperature maintained at 650° C. The weight changes due to carbon formation on the bimetallic powders are shown in Table II below.

TABLE II

Effect of Catalyst Composition on the Production of Carbon Filaments

| Catalyst Composition Cu:Ni Ratio | % Conv. of Ethylene to Carbon |
|---|---|
| 80:20 | 9.8 |
| 70:30 | 59.6 |
| 50:50 | 71.0 |
| 30:70 | 69.2 |
| 20:80 | 63.7 |
| 10:90 | 54.3 |
| 0:100 | 31.1 |

EXAMPLE 3

The experimental procedure used in Example 1 was followed in all, except the reaction time was varied from 0.5 to 8 hours and the reaction temperature was maintained at 600° C. The weight changes due to carbon formation on the bimetallic powders are shown in Table III below.

TABLE III

Effect of Reaction Time on Carbon Filament Yield

| Reaction Time (Hrs.) | % Conversion of Ethylene to Carbon |
|---|---|
| 0.5 | 59.5 |
| 1.0 | 67.3 |
| 1.5 | 66.0 |
| 2.0 | 62.4 |
| 3.0 | 58.7 |
| 4.0 | 56.9 |
| 5.0 | 57.8 |
| 6.0 | 56.1 |
| 8.0 | 50.2 |

EXAMPLE 4

In a series of comparative experiments, 100 mg of iron and nickel and various bimetallic of these metals were placed in the reactor system described in Example 1, then initially heated in a 10% hydrogen/helium mixture (100 sccm) at 350° C. for 30 minutes. Following this treatment the samples were brought to a temperature of 600° C. in helium. The helium was replaced with a flow of ethylene/hydrogen environment where the ratio of hydrocarbon/hydrogen was systematically varied from 100/0 to 10/90 for a constant reaction of 1.5 hours. The data obtained from these experiments is presented in Table IV below.

TABLE IV

% Carbon Filament Yield From Various Catalysts As a Function of Ethylene/Hydrogen Ratio

| | % CARBON YIELD ETHYLENE/HYDROGEN RATIO | | | | | | |
|---|---|---|---|---|---|---|---|
| Catalyst | 100:0 | 4:1 | 2:1 | 1:1 | 1:2 | 1:4 | 1:9 |
| Nickel | 0 | 1.7 | 7.4 | 44.2 | 32.8 | 31.6 | — |
| Copper-Nickel (3:7) | 74.3 | 66.5 | 65.5 | 57.9 | 42.3 | 26.8 | 17.1 |
| Copper-Nickel (1:1) | 69.6 | — | — | 62.7 | 53.2 | 26.8 | — |
| Iron | 0 | 0.2 | 0.5 | 1.0 | 1.5 | 2.0 | — |
| Copper-Iron (3:7) | 0 | 3.3 | 6.4 | 60.7 | 52.8 | 27.1 | — |
| Silver-Iron (3:7) | 1.0 | 39.0 | — | 40.3 | — | 51.9 | — |
| Nickel-Iron (8:2) | 62.3 | 67.3 | — | 70.8 | — | 66.1 | — |
| Nickel-Iron (1:1) | 1.0 | 4.0 | — | 16.9 | — | 50.2 | 51.2 |
| Nickel-Iron-Copper (7:12:1) | 64.1 | 63.4 | 68.4 | 68.6 | 65.7 | 63.3 | 44.6 |

EXAMPLE 5

Resistivity measurements of samples of carbon filaments prepared according to the procedure outlined in Example 1, were compared with those of other materials in an attempt to determine the graphitic nature of the filaments as a function of the catalyst composition. The relative values obtained are presented in Table V.

TABLE V

Comparison of the Electrical Resistivities Of Carbon With Various Cu/Ni Alloys

| BIMETALLIC COMPOSITION Cu:Ni | RELATIVE RESISTIVITY ohms-cm |
|---|---|
| 0:100 | 4.43 |
| 5:95 | 4.25 |
| 10:90 | 3.65 |
| 20:80 | 3.27 |
| 30:70 | 4.02 |
| 85:15 | 6.75 |
| Graphite | 1.76 |
| Active Carbon (DARCO KB)* | $3.26 \times 10^3$ |
| Alumina | $4.2 \times 10^6$ |

* = Active carbon available from Norit Carbon Co.

EXAMPLE 6

In another series of characterization studies, 50 mg of carbon filaments produced from various catalyst compositions were gasified in carbon dioxide using a thermogravimetric technique. Samples of carbon filaments were prepared as described in Example 1 and heated at a constant rate in carbon dioxide up to 1000° C. and changes in weight recorded as a function of reaction time. In a parallel set of experiments, samples of SP-1 graphite were also gasified in carbon dioxide using copper:nickel bimetallics of identical composition to that present in carbon filaments and were used as reference. SP-1 graphite is a spectrographically pure graphite available from Union Carbide Co. A synopsis of the data is given in Table VI.

TABLE VI

Reactivity of Carbon Filaments to $CO_2$ As a Function of Catalyst Composition

| Catalyst | Type of Carbon | TEMPERATURE °C. | | | | | | | |
|---|---|---|---|---|---|---|---|---|---|
| | | 650 | 700 | 750 | 800 | 850 | 900 | 950 | 1000 |
| Ni | Filaments | 19.8 | 47.7 | 88.6 | 97.7 | | | | |
| | Graphite | | | 15.5 | 53.6 | 88.7 | 97.4 | | |
| Cu:Ni (1:9) | Filaments | | | | 10.0 | 65.8 | 83.3 | 90.8 | |
| | Graphite | | | | 26.3 | 51.6 | 78.9 | 92.7 | |
| Cu:Ni (2:8) | Filaments | | | | 7.7 | 46.2 | 63.8 | 80.0 | 93.7 |
| | Graphite | | | | 7.4 | 21.3 | 42.6 | 70.2 | 88.3 |
| Cu:Ni (5:5) | Filaments | | | 2.9 | 6.7 | 17.3 | 41.3 | 72.1 | 88.5 |
| | Graphite | | | | 6.5 | 16.2 | 30.3 | 50.3 | 67.6 |
| Cu:Ni (7:3) | Filaments | | 1.0 | 5.0 | 15.0 | 38.6 | 68.0 | 88.0 | |
| | Graphite | | | | 2.0 | 2.5 | 3.0 | 7.2 | 14.4 |

From this data, we can conclude that filaments produced from copper:nickel alloys containing a high fraction of nickel exhibit gasification characteristics which are similar to that found in graphite, i.e. such filaments contain a large fraction of graphite.

EXAMPLE 7

Straight filaments can be produced from the interaction of iron with a reactant comprising a mixture of carbon monoxide, ethylene, and hydrogen at a temperature between 500° and 1100° C. Optimum yields of filaments were found at 600° C. at a gas mixture of ethylene, carbon monoxide, and hydrogen (3:1:1). It was found from high resolution transmission electron microscopy studies that when the catalyst was in the form of unsupported iron powder the filamentous structures produced had a stacking arrangement in which the graphite platelets were oriented substantially perpendicular to the axis of the filaments. The measured spacing between the graphite platelets was 0.335 nm. If the iron was dispersed on a suitable support medium, such as graphite, silica, or γ-alumina, the structure of the filaments was one in which the graphite platelets were aligned in a direction substantially parallel to the axis of the filament.

Table VII below shows the effect of gas composition on the yield of straight carbon filaments from the interaction of $C_2H_4$—CO—$H_2$ with unsupported iron powder at 600° C. and 60 minutes.

TABLE VII

| $C_2H_4$—CO—$H_2$ Molar Ratio | % Carbon Filament Yield |
|---|---|
| 80:0:20 | 0.51 |
| 73:7:20 | 20.3 |
| 8:12:20 | 50.3 |
| 60:20:20 | 68.1 |
| 38:42:20 | 67.9 |
| 17:63:20 | 45.9 |
| 0:80:20 | 21.9 |

The above table evidences the importance of CO for the production of carbon filaments of the present invention when using Fe as a catalyst.

What is claimed is:

1. A composite structure comprised of carbon filaments in a matrix material, wherein the matrix material is selected from the group consisting of organic and inorganic polymeric materials, carbon, ceramic materials, metals, and mixtures thereof, and said carbon filaments are characterized as having; (i) a surface area from about 50 $m^2/g$ to 800 $m^2/g$, (ii) an electrical resistivity from about 0.17 μohm·m to 0.8 μohm·m, (iii) a crystallinity from about 5% to about 100%, (iv) a length up to about 100 microns; and (v) composed of graphite platelets substantially perpendicular to the longitudinal axis of said filaments.

2. The composite structure of claim 1 wherein the carbon filaments have a crystallinity of about 50% to 100%.

3. The composite structure of claim 2 which have an electrical resistivity of 0.2 μohm·m to 0.5 μohm·m, and a crystallinity from about 75% to 100%.

4. The composite structure of claim 3 wherein the organic polymers are selected from the group consisting of thermoplastic resins, thermosetting resins, and elastomers.

5. The composite structure of claim 4 wherein the matrix material is comprised of a blend of a thermoplastic resin and an elastomer.

6. The composite structure of claim 4 wherein the shape of the carbon filaments are selected from the group consisting of straight, branched, twisted, spiral, helical, coiled, and ribbon-like.

7. The composite structure of claim 4 wherein the carbon filaments are electrically conducting.

8. The composite structure of claim 6 wherein the matrix material is electrically conductive.

9. A composite comprised of carbon filaments in a matrix material, wherein the matrix material is selected from the group consisting of thermoplastic resins, thermosetting resins, and elastomers, and mixtures thereof, and said carbon filaments are characterized as having; (i) a surface area from about 100 to 700 $m^2/g$, (ii) an electrical resistivity from about 0.3 μohm·m to 0.5 μohm·m, (iii) a crystallinity from about 90% to about 100%, and (iv) a length from about 1 micron to about 50 microns.

10. The composite structure of claim 9 wherein the matrix material is comprised of a blend of a thermoplastic resins and an elastomer.

* * * * *